US012148276B2

(12) United States Patent
Doyle et al.

(10) Patent No.: US 12,148,276 B2
(45) Date of Patent: Nov. 19, 2024

(54) SPECTRAL AUTOCORRELATION BASED SECURITY SYSTEM

(71) Applicant: International Business Machines Corporation, Armonk, NY (US)

(72) Inventors: Matthew Doyle, Chatfield, MN (US); Jeffrey N. Judd, Oronoco, MN (US); Timothy J. Tofil, Rochester, MN (US); Matteo Cocchini, New York, NY (US); Stuart Brett Benefield, Durham, NC (US); Samuel R. Connor, Apex, NC (US); Andrew Corbett, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 294 days.

(21) Appl. No.: 17/840,662

(22) Filed: Jun. 15, 2022

(65) Prior Publication Data
US 2023/0410617 A1 Dec. 21, 2023

(51) Int. Cl.
*G08B 13/16* (2006.01)
*G06F 18/2113* (2023.01)

(52) U.S. Cl.
CPC ...... *G08B 13/1672* (2013.01); *G06F 18/2113* (2023.01)

(58) Field of Classification Search
CPC .. G08B 13/1672; G06F 18/2113; G06F 18/00
See application file for complete search history.

(56) References Cited

U.S. PATENT DOCUMENTS

| 4,857,912 A | * | 8/1989 | Everett, Jr. | ............ | G08B 19/00 |
| | | | | | 340/508 |
| 8,607,093 B2 | | 12/2013 | Dehaan | | |
| 8,954,563 B2 | | 2/2015 | Scarpelli | | |
| 2011/0317553 A1 | * | 12/2011 | Dinan | .................. | H04L 5/0037 |
| | | | | | 370/230 |

(Continued)

FOREIGN PATENT DOCUMENTS

KR 101794733 B1 11/2017

OTHER PUBLICATIONS

"Signal Detection in White Gaussian Noise", downloaded from the Internet on Feb. 15, 2022, 6 pages, <https://www.mathworks.com/help/phased/ug/signal-detection-in-white-gaussian-noise.html>.

(Continued)

*Primary Examiner* — Omeed Alizada
(74) *Attorney, Agent, or Firm* — Aaron N. Pontikos (57) ABSTRACT

According to one embodiment of the present invention, a computer-implemented method for autocorrelation based security monitoring and detection is disclosed. The computer-implemented method includes determining that input signal data transmitted to a white noise generator autocorrelates with itself at one or more time lags. The computer-implemented method further includes, responsive to determining that the input signal data transmitted to the white noise generator autocorrelates with itself at one or more time lags, determining whether an autocorrelation in the input signal data transmitted to the white noise generator matches one or more predetermined input signal data patterns associated with a known event or individual.

20 Claims, 5 Drawing Sheets

(56) References Cited

U.S. PATENT DOCUMENTS

| | | | | | |
|---|---|---|---|---|---|
| 2012/0120768 | A1* | 5/2012 | Horsky | ............... | G01S 15/931 |
| | | | | | 327/60 |
| 2014/0266600 | A1* | 9/2014 | Alberth, Jr. | .......... | G06V 40/172 |
| | | | | | 340/5.83 |
| 2020/0402679 | A1* | 12/2020 | Hashemian | .......... | G05B 19/042 |

OTHER PUBLICATIONS

"Testing for White Noise", DSP RELATED.com, downloaded from the Internet on Feb. 15, 2022, 2 pages, <https://www.dsprelated.com/freebooks/sasp/Testing_White_Noise.html>.

Benabdelkader, Chiraz, "Gait as a Biometric for Person Identification in Video," Dissertation, 2002, 101 pages.

Brownlee, Jason, "White Noise Time Series with Python", Machine Learning Mastery, Mar. 6, 2017, Time Series, Last Updated Aug. 14, 2020, 18 pages, <https://machinelearningmastery.com/white-noise-time-series-python/>.

Deleforge, Antoine, "Acoustic Space Mapping: A Machine Learning Approach to Sound Source Separation and Localization", Machine Learning [cs.LG]. Université de Grenoble, 2013, English, <tel-00913965>, 134 pages.

Delignieres et al., "Theoretical and methodological issues in serial correlation analysis," (2013), Advances in Experimental Medicine and Biology, 782, 127-148, 16 pages.

Grauer, Jared A., "Random Noise Generation Using Fourier Series", American Institute of Aeronautics and Astronautics, Feb. 22, 2018, doi: 10.2514/1.C034616, Publication: Journal of Aircraft, vol. 55, Issue: 4, 13 pages, <https://ntrs.nasa.gov/archive/nasa/casi.ntrs.nasa.gov/20190026624.pdf>.

Hausdorff et al., "Is walking a random walk? Evidence for long-range correlations in stride interval of human gait," Journal of applied physiology 78.1 (1995): 349-358.

Huang, Lin, "Automated Biometrics of Audio-Visual Multiple Modals." A Dissertation submitted to the Faculty of The College of Engineering and Computer Science in Fulfillment of the Requirements for the Degree of Doctor of Philosophy, Florida Atlantic University, Boca Raton, FL, May 10, 2010, 177 pages.

Koch, Antony, "Can you programmatically detect white noise?", downloaded from the Internet on Feb. 15, 2022, 7 pages, <https://stackoverflow.com/questions/3881256/can-you-programmatically-detect-white-noise>.

Kwasnicka et al., "N-of-1 methods: A practical guide to exploring trajectories of behaviour change and designing precision behaviour change interventions," Psychology of Sport and Exercise, (2019), 34 pages, doi: https://doi.org/10.1016/j.psychsport.2019.101570.

Mell et al., "The NIST Definition of Cloud Computing", Recommendations of the National Institute of Standards and Technology, NIST Special Publication 800-145, Sep. 2011, 7 pages.

Tumkur et al., "Modeling Human Walking for Step Detection and Stride Determination by 3-Axis Accelerometer Readings in Pedometer", 2012 Fourth International Conference on Computational Intelligence, Modelling and Simulation, DOI 10.1109/CIMSim.2012.65, 6 pages.

Zhao et al., "On Detection of the Number of Signals in Presence of White Noise", Journal of Multivariate Analysis 20, pp. 1-25 (1986), <https://core.ac.uk/download/pdf/82271545.pdf>.

* cited by examiner

SPECTRAL AUTOCORRELATION BASED SECURITY SYSTEM

BACKGROUND OF THE INVENTION

The present invention relates generally to the field of security systems, and more particularly to spectral autocorrelation based security systems.

A security system is designed to detect intrusion, such as unauthorized entry into a building or particular designated area. Security systems used in residential or commercial applications protect against burglary, theft, and property damage, as well as personal protection. Typically, a security system consists of a group of physical electronic components, such as security cameras, motion sensors, and entry sensors (i.e., contact sensors) that all work together to monitor and protect a given space.

Autocorrelation (also known as serial correlation) is a mathematical representation of the degree of similarity between a given time series and a lagged version of itself over successive time intervals. Although conceptually similar to the correlation between two different time series, autocorrelation uses the same time series twice—once its original form and once lagged over one or more time periods. In other words, autocorrelation is the correlation of a signal with a delayed copy of itself as a function of delay. The analysis of autocorrelation is a mathematical tool for finding repeating patterns, such as the presence of a period signal obscured by noise, or identifying the missing fundamental frequency in a signal implied by its harmonic frequencies.

SUMMARY

According to one embodiment of the present invention, a computer-implemented method for autocorrelation based security monitoring and detection is disclosed. The computer-implemented method includes determining that input signal data transmitted to a white noise generator autocorrelates with itself at one or more time lags. The computer-implemented method further includes, responsive to determining that the input signal data transmitted to the white noise generator autocorrelates with itself at one or more time lags, determining whether an autocorrelation in the input signal data transmitted to the white noise generator matches one or more predetermined input signal data patterns associated with a known event or individual.

According to another embodiment of the present invention, a computer program product for autocorrelation based security monitoring and detection is disclosed. The computer program product includes one or more computer readable storage media and program instructions stored on the one or more computer readable storage media. The program instructions include instructions to determine that input signal data transmitted to a white noise generator autocorrelates with itself at one or more time lags. The program instructions further include, responsive to determining that the input signal data transmitted to the white noise generator autocorrelates with itself at one or more time lags, instructions to determine whether an autocorrelation in the input signal data transmitted to the white noise generator matches one or more predetermined input signal data patterns associated with a known event or individual.

According to another embodiment of the present invention, a computer system for autocorrelation based security monitoring and detection is disclosed. The computer system includes one or more computer system includes one or more computer processors, one or more computer readable storage media, and program instructions stored on the computer readable storage media for execution by at least one of the one or more processors. The program instructions include instructions to determine that input signal data transmitted to a white noise generator autocorrelates with itself at one or more time lags. The program instructions further include, responsive to determining that the input signal data transmitted to the white noise generator autocorrelates with itself at one or more time lags, instructions to determine whether an autocorrelation in the input signal data transmitted to the white noise generator matches one or more predetermined input signal data patterns associated with a known event or individual.

DETAILED DESCRIPTION

The present invention relates generally to the field of security systems, and more particularly to spectral autocorrelation based security systems.

Embodiments of the present invention recognize that a key attribute of white noise is the absence of serial correlation (i.e., the absence of autocorrelation) in time (except for delay=0, at which time, the signal correlates with itself). At all other points in time, white noise is a random signal having equal intensity at different frequencies, giving it a constant power spectral density. In other words, white noise is a random signal in which the power spectrum is constant across frequency or time. However, noise sequences autocorrelate when the phase noise distribution does not correlate with lagging versions of the same noise sequence. Accordingly, embodiments of the present invention recognize that this fact can be used to detect machines faults and even the authorized or unauthorized presence of an individual within a secure area.

Embodiments of the present invention utilize the deterministic nature of autocorrelation to determine when a triggering event has occurred (e.g., a machine fault or entry of an individual into a secure location) by detecting a shift from a random, non-deterministic white noise signal to a deterministic white noise signal. The particular shift in a white noise signal is not only used to detect a triggering event, but is also used to identify the particular event that has occurred. According to embodiments of the present invention, serial autocorrelation is used to provide for security and/or data analytic solutions by detecting anomalies, changes, or transients (momentary variations in current, voltage, or frequency) in the input requirements of a white noise generator. Machine or mechanical failures, as well as entry of a person into a secure space is detected by monitoring the input signal data transmitted to a white noise generator, detecting that the input signal data transmitted to the white noise generator autocorrelates with itself at one or more time lags, and post-processing the computed autocorrelations in the input signal data transmitted to the white noise generator to determine whether the computed autocorrelations match a known anomaly, event condition, or individual.

According to one aspect of the present invention, a computer-implemented method, computer program product, and system for determining a unique signature of a person's gait by analyzing a long range (i.e., time span) correlation of motion is provided. The identification and tracking of authorized individuals (or the identification of unauthorized individuals) is achieved based on an expected serial autocorrelation of a human stride that is unique to a particular known individual. The identification and tracking of an individual within a secure environment is achieved based on a comparison of a detected autocorrelation in the input signal data transmitted to a white noise generator over one or more time lags with one or more predetermined input signal data patterns associated with a known individual's gait, stride, or cadence.

According to another aspect of the present invention, a computer-implemented method, computer program product, and system for identifying and tracking machine or mechanical failures within an environment is provided. The identification and tracking of machine or mechanical failures is achieved based on a comparison of a detected autocorrelation in the input signal data transmitted to a white noise generator over one or more time lags with one or more predetermined input signal data patterns associated with a particular machine or mechanical failure.

In an embodiment, sequences of input signal data (i.e., input power across an input frequency spectrum) sampled at different time lags are analyzed to determine whether the phase distribution of the input signal data transmitted to a white noise generator resembles a uniform phase distribution. In an embodiment, the distribution of phase angles is determined using the empirical cumulative distribution (CDF). For a uniform distribution, the CDF of a white noise input signal is a straight line. Any large deviations in a straight line indicate a different distribution, and thus the potential for autocorrelations in the input signal data transmitted to a white noise generator over one or more time lags.

In an embodiment, a sample set of input signal data transmitted to a white noise generator autocorrelate when the phase distribution does not correlate with lagging versions of the same white noise input data sequence. In an embodiment, the input signal data transmitted to a white noise generator autocorrelate if a phase distribution of the input signal data sample set exceed a predetermined noise phase distribution level. In an embodiment, the sample set of input signal data transmitted to a white noise generator autocorrelate if a randomness of the sequence of input signal data is below a predetermined threshold. In an embodiment, two input signal data sequences including input power and an input frequency spectrum transmitted at one or more time lags to a white noise generator autocorrelate if the two signal data sequences have a degree of similarity above a predetermined threshold. In an embodiment, two input signal data sequences including input power and an input frequency spectrum transmitted at one or more time lags to a white noise generator autocorrelate if a randomness of each of the two input signal data sequences is below a predetermined threshold and the two input signal data sequences have a degree of similarity above a predetermined threshold.

In an embodiment, detected autocorrelations in the input signal data transmitted to a white noise generator are compared to predetermined white noise input patterns to identify a known anomaly, event condition, or even the presence of an authorized or unauthorized individual within a secure environment. In an embodiment, determining a presence of an individual within a secure environment, or whether an anomaly or event condition within a secure environment has occurred includes detecting autocorrelations in the input signal data (i.e., input power and input frequency spectrum) transmitted to a white noise generator at varying time lags and matching detected autocorrelations to predetermined input signal data patterns associated with a known anomaly, event condition, or individual.

In an embodiment, a match is determined if an autocorrelation in the input signal data transmitted to a white noise generator and a predetermined input signal data sequence associated with a known anomaly, event condition, or individual have a degree of similarity above a predetermined threshold. In an embodiment, a match is determined if a phase distribution corresponding to an autocorrelation in the input signal data transmitted to a white noise generator and a phase distribution corresponding to a predetermined input signal data sequence associated with a known anomaly, event condition, or individual have a degree of similarity above a predetermined threshold.

In an embodiment, a sample set of input signal data transmitted to a white noise generator at one or more time lags autocorrelates with itself when the phase distribution does not correlate with lagging versions of the input signal data. In an embodiment, a sample set of input signal data transmitted to a white noise generator at one or more time lags autocorrelates with itself if a phase distribution of the sample set exceeds a predetermined noise phase distribution level. In an embodiment, a sample set of input signal data transmitted to a white noise generator at one or more time lags autocorrelates with itself if a randomness of each sample in the sample set is below a predetermined threshold. In an embodiment, a sample set of input signal data (e.g., input power across an input frequency spectrum) transmitted to a white noise generator at one or more time lags autocorrelate if each sample in the sample set have a degree of similarity above a predetermined threshold. In an embodiment, a sample set of input signal data (e.g., input power across an input frequency spectrum) transmitted to a white noise generator at one or more time lags autocorrelate if a randomness of if each sample in the sample set is below a predetermined threshold and the each sample in the sample set have a degree of similarity above a predetermined threshold.

In an embodiment, a spectrogram of a detected autocorrelation in the input signal data transmitted to a white noise generator at one or more time lags is generated, and the spectrogram is compared to a spectrogram of a predetermined input signal data pattern associated with a known anomaly, event condition, or individual. In an embodiment, the spectrogram of corresponding to a detected autocorrelation in the input signal data includes individual spectral components of the input signal data over a period of time (i.e., single sinusoidal oscillations at distinct frequencies each within their own amplitude and phase). In an embodiment, a match is determined if a spectrogram corresponding to a detected autocorrelation in the input signal data transmitted to a white noise generator and a spectrogram corresponding to a predetermined input signal data pattern associated with a known anomaly, event condition, or individual have a degree of similarity above a predetermined threshold.

In an embodiment, in response to determining that a detected autocorrelation in the input signal data transmitted to a white noise generator at one or more time lags matches a predetermined input signal data pattern associated with a known event, and the known event is not permitted, one or more security action are performed based, at least in part, on the particular known event. For example, if the particular known event is a malfunctioning server, the security action may include, but is not limited to, sending an alert or notification to a system administrator about the detected malfunctioning server, or automatically sending instructions to the malfunctioning server to block or reroute incoming service queries to a different server. In an embodiment, in response to determining that a detected autocorrelation in the input signal data transmitted to a white noise generator at one or more time lags matches a predetermined input signal data pattern associated with a known individual, a further determination is made as to whether the presence of the individual within an area associated with the white noise generator is authorized.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suit-able combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting. Notwithstanding, several definitions that apply throughout this document now will be presented.

As defined herein, the singular forms "a," "an," and "the" include the plural forms as well, unless the context clearly indicates otherwise.

As defined herein, "another" means at least a second or more.

As defined herein, "automatically" and "dynamically" mean without user intervention.

As defined herein, "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, "if" means "in response to" or "responsive to," depending upon the context. Thus, the phrase "if it is determined" may be construed to mean "in response to determining" or "responsive to determining" depending on the context. Likewise the phrase "if [a stated condition or event] is detected" may be construed to mean "upon detecting [the stated condition or event]" or "in response to detecting [the stated condition or event]" or "responsive to detecting [the stated condition or event]" depending on the context.

As defined herein, "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the phrases "in response to" and "responsive to" mean responding or reacting readily to an action or event. Thus, if a second action is performed "in response to" or "responsive to" a first action, there is a causal relationship between an occurrence of the first action and an occurrence of the second action. The phrases "in response to" and "responsive to" indicate the causal relationship.

As defined herein, "real time" means a level of processing responsiveness that a user or system senses as sufficiently immediate for a particular process or determination to be made, or that enables the processor to keep up with some external process.

As defined herein, "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, "user" and "individual" each refer to a human being.

The terms first, second, etc. may be used herein to describe various elements. These elements should not be limited by these terms, as these terms are only used to distinguish one element from another unless stated otherwise or the context clearly indicates otherwise.

Figure 1:
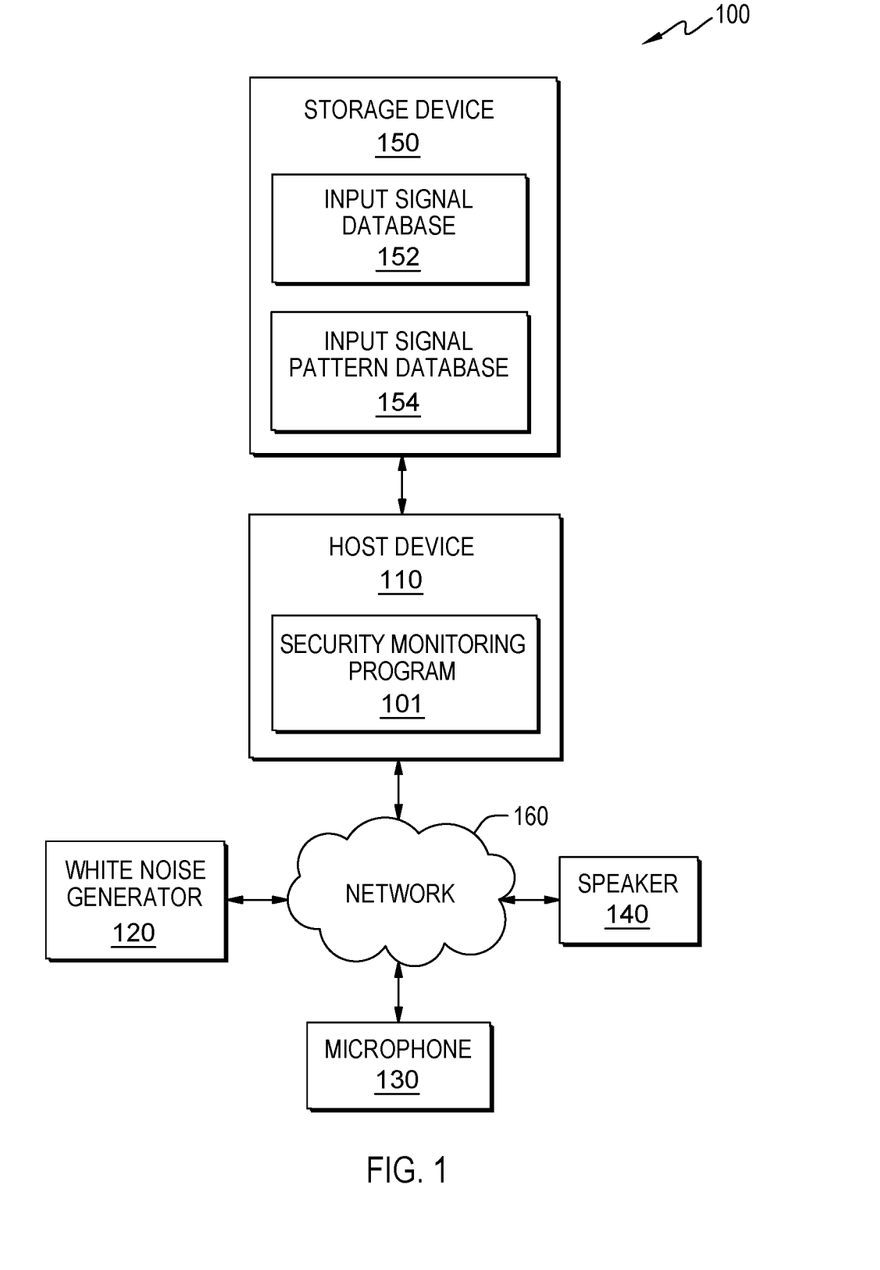
FIG. 1 is a functional block diagram of a network computing environment, generally designated 100, suitable for performing spectral autocorrelation based security monitoring and detection in accordance with at least one embodiment of the present invention.

FIG. 1 is a functional block diagram of a network computing environment, generally designated 100, suitable for performing spectral autocorrelation based security monitoring and detection in accordance with at least one embodiment of the present invention. FIG. 1 provides an illustration of only one implementation and does not imply any limitations with regard to the environments in which different embodiments may be implemented. Many modifications to the depicted environment may be made by those skilled in the art without departing from the scope of the invention as recited by the claims.

Network computing environment 100 includes host device 110, white noise generator 120, microphone 130, speaker 140, and storage device 150 interconnected over network 160. Although only a single white noise generator 120, microphone 130, and speaker 140 are depicted in FIG. 1, embodiments of the present invention may be practiced using any number of white noise generators 120, microphones 130, and speakers 140. Moreover, although white noise generator 120 is depicted in FIG. 1 as being external to host device 110, in alternative embodiments, white noise generator 120 may be integrated with host device 110. Similarly, although microphone 130 and speaker 140 are depicted in FIG. 1 as being external to host device 110, in alternative embodiments, microphone 130 and/or speaker 140 may be integrated with host device 110.

In embodiments of the present invention, network 160 can be a telecommunications network, a local area network (LAN), a wide area network (WAN), such as the Internet, or a combination of the three, and can include wired, wireless, or fiber optic connections. Network 160 may include one or more wired and/or wireless networks that are capable of receiving and transmitting data, voice, and/or video signals, including multimedia signals that include voice, data, and video information. In general, network 160 may be any combination of connections and protocols that will support communications between host device 110, white noise generator 120, microphone 130, speaker 140, and other computing devices (not shown) for performing autocorrelation based security monitoring within network computing environment 100. An alert or notification of detected machine faults or the presence of an unauthorized individual within a secure environment may then be transmitted to a system administrator via host device 110.

In embodiments of the present invention, one or more white noise generators 120 are located within network computing environment 100. In an embodiment, network computing environment 100 can have one or more microphones 130 that detect ambient sound. For example, one or more network machines within network computing environment 100 can have embedded or associated sensors, such as one or more microphones 130, to detect ambient sound in or near the machine. The one or more microphones 130 can digitize and transmit those signals to one or more white noise generators, such as white noise generator 120. Host device 110 can host a monitoring tool, such as security monitoring program 101, configured to receive continuous, periodic, and/or irregular streams of a white noise input data signal transmitted to white noise generator 120. Autocorrelations in the input data signal data transmitted to white noise generator 120 over one or more time lags are computed in order to detect potential faults, failures, and/or other conditions, such as the present of an authorized or unauthorized individual within a secure environment.

Host device 110 is a computing device that can be a standalone device, a management server, a web server, a mobile device, or any other electronic device or computing system capable of receiving, sending, and processing data. In other embodiments, host device 110 represents a server computing system utilizing multiple computers as a server system, such as in a cloud computing environment. In an embodiment, host device 110 represents a computing system utilizing clustered computers and components (e.g., database server computers, application server computers, web server computers, etc.) that act as a single pool of seamless resources when accessed within network computing environment 100. In general, host device 110 represents any programmable electronic device or combination of programmable electronic devices capable of executing machine readable program instructions and communicating with white noise generator 120, microphone 130, speaker 140, storage device 150, and other computing devices (not shown) within network computing environment 100 via a network, such as network 160.

White noise generator 120 may be any generally known white noise generation systems known in the art that are capable of generating white noise. One of ordinary skill in the art will understand white noise to be a randomly generated signal having equal intensity at different frequencies, thereby giving the white noise signal a constant power spectral density. In discrete time, white noise is a discrete signal whose samples are regarded as a sequence of serially uncorrelated random variables with zero mean and finite variance. In digital image processing, the pixels of a white noise image are typically arranged in a rectangular grid and are assumed to be independent random variables with uniform probability distribution over a given time interval. Thus, random signals are considered "white noise" if they are observed to have a flat spectrum over the range of frequencies that are relevant to a particular context. For an audio signal, the relevant range of white noise is the band of audible sound frequencies (between 20 and 20,000 Hz). In an embodiment, white noise generator 120 is capable of generating signals having frequencies between $f_{step}$ and $f_{max}$, where f max is set by the desired time step ($f_{max}=1/t_{step}$) and $f_{step}$ is set to the largest delay time needed ($f_{step}=1/t_{max}$). In an embodiment, white noise generator 120 is capable of generating signals having frequencies that range between 20 and 20,000 Hz.

In an embodiment, white noise generator 120 includes a communication interface (not depicted) that allows white noise generator 120 to communicate with external devices, and vice versa. For example, the communication interface allows host device 110 to adjust the input power (i.e., amplitude) and input frequency spectrum of a signal transmitted to white noise generator 120. In an embodiment, the communication interface allows microphone 130 to transmit ambient noise captured from an environment to host device 110 in order to detect changes in the ambient noise of the environment. In an embodiment, the communication interface allows white noise generator 120 to transmit white noise audio signals to speaker 140, which are then converted into sound waves that are emitted into the environment.

In an embodiment, white noise generator 120 generates random noise sequences using standard methods. For example, a (pseudo) random generator algorithm it utilized, which produces a sequence from a uniform distribution. The random sequence is then mapped to a desired distribution, passed through coloring or shaping filters to tailor the power spectrum (i.e., spectral factorization), and then scaled to the desired level. In another embodiment, white noise generator 120 generates random noise sequences using the Lanczos method. Here, a Gaussian "ideal white noise pattern" is synthesized using the Fourier series, by summing harmonic sinusoids with constant amplitudes and random phase angles drawn from a uniform distribution. By extension, the spectral coloring of the noise is designed by the particular selection of the sinusoid amplitudes.

In an embodiment, the input power of white noise generator 120 required to minimize or block ambient noise of an environment is altered based on detected changes in ambient noise levels of the environment. For example, assume that white noise generator 120 is located in a server room containing ten identical servers. Let it further be assumed that only five of the ten servers are currently running. Based on the noise level generated by the five servers that are running, the input power of white noise generator 120 is set to 10 watts. However, if the other five servers come online, such that all ten servers are currently running, the input power transmitted to white noise generator 120 may automatically be adjusted to 20 watts in order to increase the amplitude of the signal generated by white noise generator 120 in order to compensate for the increased noise level resulting from the additional servers running.

In an embodiment, the input frequency spectrum transmitted to white noise generator 120 required to minimize or block ambient noise of an environment is altered based on detected changes in ambient noise of the environment. For example, assume that white noise generator 120 is located in a server room and that five servers are currently running. Based on the particular type(s) of noise (i.e., sound frequencies) generated by these five servers, a first input frequency spectrum is selected for white noise generator 120. However, if one or more server cooling fans turn on, resulting in a detected change in the particular sound frequencies captured from the server room, the first input frequency spectrum transmitted to white noise generator 120 is adjusted in order to compensate for the change in sound frequencies resulting from the server cooling fan(s).

In an embodiment, input signal data (i.e., input power across input frequency spectrum) transmitted to white noise generator 120 is visually represented as a spectrogram. For example, input signal data transmitted to white noise generator 120 is sampled overtime at one or more time lags, the input signal data is converted into individual intensity and frequency components (i.e., single sinusoidal oscillations at distinct frequencies each within their own amplitude and phase), and graphically represented as a correlogram or autocorrelation plot. In an embodiment, any generally known FFT algorithms may be utilized to compute the Discrete Fourier Transform (DFT) of white noise input signal data transmitted over time to white noise generator 120.

In an embodiment, the spectrogram of the input signal data is analyzed to determine whether the input signal data transmitted to white noise generator 120 autocorrelates with itself at one or more time lags. Here, auto-correlation occurs in a time series when a signal correlates with a delayed version of itself. Accordingly, if the input signal data does not autocorrelate with itself, it can be assumed that the white noise input signal has a constant power (or within a predetermined range) across frequency spectrum. To test whether the input signal has a constant power across frequency spectrum, a sample size of the spectrogram (i.e., a number of spectral components over a predetermined period of time) is analyzed to determine whether the spectrogram sample size approaches an impulse in the limit as the number of samples increases. In other words, the spectrogram sample size is analyzed to determine whether successive input white noise samples are uncorrelated.

For example, a sample set of input signal data transmitted to white noise generator 120 is broken up into successive blocks over time, a FFT is used to compute the DFT of the sample set of input signal data for each block, and the squared DFT of each block is averaged. If the resulting average magnitude spectrum is flat, then the set of samples are determined to be devoid of any autocorrelations. However, if the resulting average magnitude spectrum is not flat (i.e., the average magnitude spectrum does not correlate, or the power across frequency spectrum is not flat), then the set of samples are determined to possibly include autocorrelations. In the latter case, the set of samples may further be compared to one or more predetermined input signal data patterns associated with respective known anomalies, event conditions, or individuals.

Microphone 130 may be any generally known audio capturing device capable of converting sound waves into electric signals. In an embodiment, microphone 130 may be a wired microphone, wireless microphone, or a combination thereof. In an embodiment, white noise generator 120 receives audio data (i.e., amplitude and frequency data corresponding to captured sound waves) from one or more microphones 130 located within a given environment. In an embodiment, sound waves captured by microphone 130 are converted to digital signals using any generally known digital signal processing (DSP) methods and systems. In an embodiment, sound waves captured by microphone 130 are transmitted to white noise generator in real-time. In another embodiment, sound waves captured by microphone 130 are transmitted to white noise generator 120 periodically or in batches (e.g., captured sound waves are converted to digital signals and are transmitted every two seconds). In another embodiment, sound waves captured by microphone 130 are converted to digital signals are transmitted to white noise generator 120 based on a triggering event (e.g., if a change in the noise phase distribution is above a predetermined threshold).

Speaker 140 may be any generally known audio generating device capable of converting electrical signals received from white noise generator 120 into sound waves. In an embodiment, speaker 140 may be a wired speaker, a wireless speaker, or a combination thereof.

In various embodiments, storage device 150 is a secure data repository for persistently storing data utilized by white noise generator 120 and security monitoring system 101. Storage device 150 may be implemented using any volatile or non-volatile storage media known in the art for storing data. For example, storage device 150 may be implemented with a tape library, optical library, one or more independent hard disk drives, multiple hard disk drives in a redundant array of independent disks (RAID), solid-state drives (SSD), random-access memory (RAM), and any, possible combination thereof. Similarly, storage device 150 may be implemented with any suitable storage architecture known in the art, such as a relational database, an object-oriented database, or one or more tables. Although storage device 150 is depicted as being external to host device 110, in alternative embodiments, storage device 150 may be integrated with host device 110.

Storage device 150 includes input signal database 152 and input signal pattern database 154. In an embodiment, input signal data database 152 includes historical input signal data transmitted to white noise generator 120 for a particular environment. In other words, the expected input power (i.e., amplitude) and input frequency spectrum transmitted to white noise generator 120 for a particular time of day and/or day of the week for a given environment is stored in input signal database 152. For example, assume that the particular environment is a server room and that the server room contains ten servers (Server 1-Server 10). According to historical use patterns of the server room on Mondays, only Servers 1-5 are typically online from 1 pm to 5 pm, only Servers 6-8 are typically online from 5 pm to 6 pm, and only Servers 9 and 10 are typically online from 6 pm to midnight. Based on the foregoing, the respective input power and input frequency spectrum data historically transmitted to white noise generator 120 in order to minimize or block the ambient noise for the server room on Mondays is stored in input signal database 152 for each of the previously mentioned time periods.

In an embodiment, input signal database 152 is updated based on expected to historical input data transmitted to white noise generator 120 for a particular environment. Continuing with the previous example, according to the historical use patterns of Servers 1-10 on Mondays, only Servers 1-5 are typically online from 1 pm to 5 pm. However, due to an expected or scheduled increase in computing resources required for next Monday between 3 pm to 5 pm, Servers 6-8 will also be online in addition to Servers 1-5. Based on the foregoing, the respective input power and input frequency spectrum required to be transmitted to white noise generator 120 in order to minimize or block the ambient noise for the server room next Monday between 3 pm to 5 pm is updated in input signal database 152 to take into account the increase in noise produced from three additional servers coming online.

In an embodiment, historical input signal data transmitted to white noise generator 120 is updated or fine-tuned based on learned changes to an environment over time. For example, continuing with the previous example, according to the historical use patterns of Servers 1-10 on Mondays, only Servers 1-5 are typically online from 1 pm to 5 pm. However, over time, security monitoring program 101 learns that the cooling fans for Server 3 repeat the following pattern during the hours of 1 pm to 5 pm: active for ten seconds, inactive for ten seconds, active for ten seconds, inactive for ten seconds, etc. Based on the foregoing, security monitoring program 101 updates the respective input power and input frequency spectrum required to be transmitted to white noise generator 120 to take into account the increase in noise produced when the cooling fans for Server 3 are active and the decrease in noise produced when the cooling fans for Server 3 are inactive.

In an embodiment, input signal pattern database 154 includes predetermined input signal data patterns associated with known anomalies, event conditions, and/or individuals. In other words, non-random, predetermined input signal data patterns in power across frequency spectrums transmitted associated with known anomalies, event conditions, and/or individuals are stored in input signal pattern database 154. In an embodiment, an identifiable input signal data pattern may be a repeating pattern, such as the presence of a periodic set of input data (i.e., input power across an input frequency spectrum) transmitted to white noise generator 120 at multiple time lags. In an embodiment, an identifiable input signal data pattern may be a single occurrence of a particular set of input data (i.e., input power across an input frequency spectrum) transmitted to white noise generator 120 at a single time lag.

In an embodiment, an input signal data pattern includes input power and input frequency spectrum signal data previously transmitted to white noise generator 120 in response to captured sound waves associated with a known event. For example, input signal data patterns may be associated with particular input power and input frequency spectrum signal data previously transmitted to white noise generator 120 in response to captured sounds waves created from a failed or failing hard drive, a failed or failing tape drive, a server cooling fan, clinking of an HVAC system, the opening and closing of a door, electrical buzzing or humming of a server, and/or other known sounds, noises, or acoustic events.

In an embodiment, an input signal data pattern includes input power and input frequency spectrum signal data previously transmitted to white noise generator 120 in response to captured sound waves associated with a known individual. For example, white noise input patterns may be associated with particular input power and input frequency spectrum signal data previously transmitted to white noise generator 120 in response to captured sound waves created from a particular individual's stride, gait, or cadence patterns. In an embodiment, a list of authorized individuals permitted for entry into a secure or restricted area and their corresponding input signal data patterns associated with their respective stride, gait, or cadence patterns are predetermined and stored in input signal pattern database 154.

Figure 2:
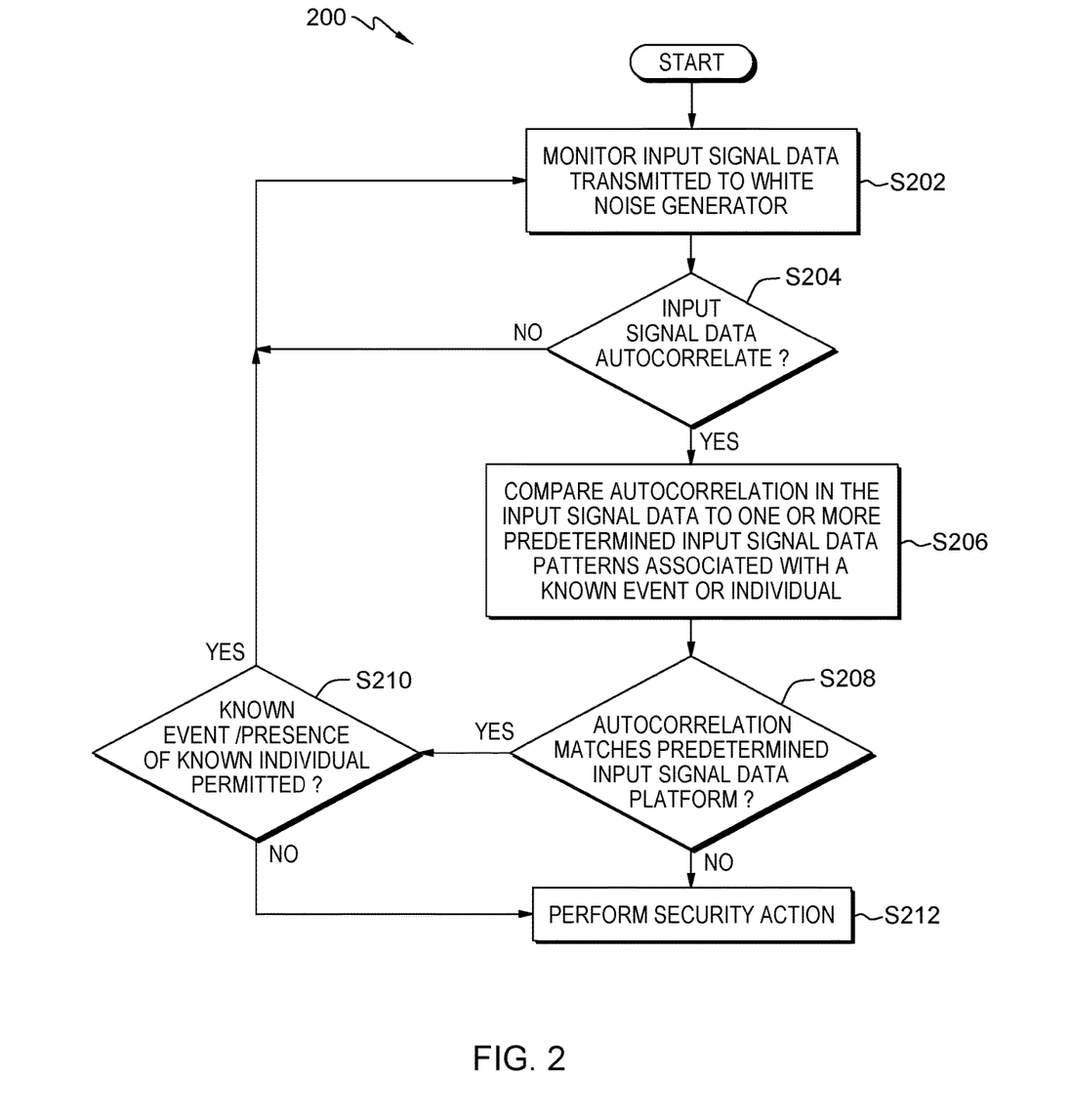
FIG. 2 is a flowchart depicting operational steps for autocorrelation based security monitoring and detection, generally designated 200, in accordance with at least one embodiment of the present invention.

FIG. 2 is a flowchart depicting operational steps for autocorrelation based security monitoring and detection, generally designated 200, in accordance with at least one embodiment of the present invention. It should be appreciated that FIG. 2 provides only an illustration of one embodiment and does not imply any limitations with regard to the environments in which different embodiments may be implemented. Many modifications to the depicted environment may be made.

At step S202, security monitoring program 101 monitors input signal data transmitted to a white noise generator. At decision step S204, security monitoring program 101 determines whether the input signal data transmitted to the white noise generator autocorrelates with itself at one or more time lags. If security monitoring program 101 determines that the input signal data transmitted to the white noise generator autocorrelates with itself at one or more time lags (decision step "YES" branch), security monitoring program 101 proceeds to step S206. If security monitoring program 101 determines that the input signal data transmitted to the white noise generator does not autocorrelate with itself at one or more time lags (decision step "NO" branch), security monitoring program 101 returns to step S202.

At step S206, security monitoring program 101 compares one or more autocorrelations in the input signal data transmitted to the white noise generator with one or more predetermined input signal data patterns associated with a known event(s) or individual(s). At decision step S208, security monitoring program 101 determines, based on the comparison, whether an autocorrelation in the input signal data matches a predetermined input signal data pattern associated with a known event or individual. If security monitoring program 101 determines that an autocorrelation in the input signal data transmitted to the white noise generator matches a predetermined input signal data pattern associated with a known event or individual (decision step "YES" branch), security monitoring program 101 proceeds to decision step S210. If security monitoring program 101 determines that an autocorrelation in the input signal data transmitted to the white noise generator does not match a predetermined white noise input signal data pattern associated with a known event or individual (decision step "NO" branch), security monitoring program 101 proceeds to step S212.

At decision step 210, in response to determining that an autocorrelation in the input signal data transmitted to the white noise generator matches a predetermined input signal data pattern associated with a known event or individual, security monitoring program 101 determines whether the known event or presence of the known individual is permitted. If security monitoring program 101 determines that the known event or presence of the known individual is permitted, security monitoring program returns to step S202. If security monitoring program 101 determines that the known event or presence of the known individual is not permitted, security monitory program 101 proceeds to step S212.

At step S212, in response to determining (at decision step 208) that an autocorrelation in the input signal data transmitted to the white noise generator does not match a predetermined white noise input signal data pattern associated with a known event or individual, security monitoring program 101 performs a particular security action. In an embodiment, the particular security action performed is based, at least in part, on the input power, input frequency spectrum, and frequency of the detected autocorrelation. Alternatively, in response to determining (at decision step 210) that the known event or presence of the known individual is not permitted, security monitoring program 101 performs a particular security action. In an embodiment, the particular security action performed is based, at least in part, on the particular type of known event or the particular individual.

Figure 3:
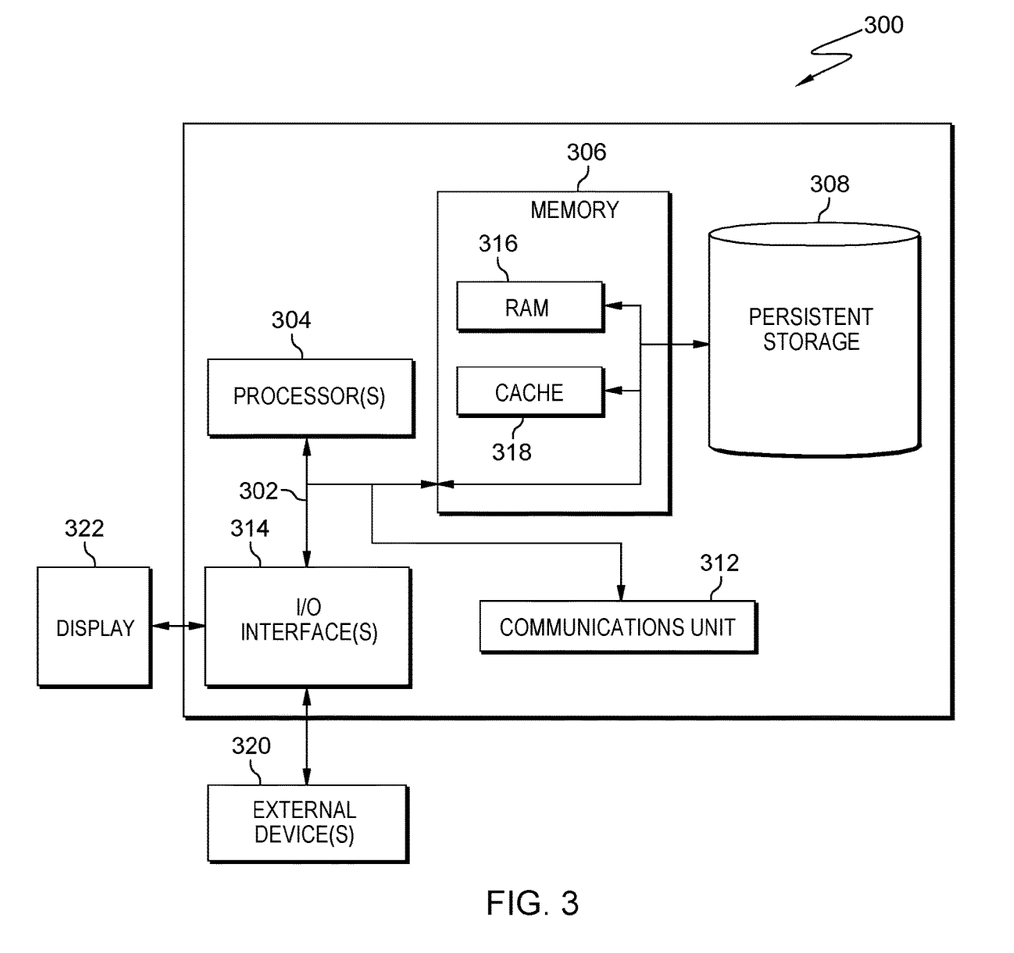
FIG. 3 is a block diagram depicting components of a computing device, generally designated 300, suitable for executing security analysis program 101 in accordance with at least one embodiment of the present invention

FIG. 3 is a block diagram depicting components of a computing device, generally designated 300, suitable for executing security analysis program 101 in accordance with at least one embodiment of the present invention. For example, computing device 300 is representative of host device 110 depicted in FIG. 1. Computing device 300 includes one or more processor(s) 304 (including one or more computer processors), communications fabric 302, memory 306 including, RAM 316 and cache 318, persistent storage 308, communications unit 312, I/O interface(s) 314, display 322, and external device(s) 320. It should be appreciated that FIG. 3 provides only an illustration of one embodiment and does not imply any limitations with regard to the environments in which different embodiments may be implemented. Many modifications to the depicted environment may be made.

As depicted, computing device 300 operates over communications fabric 302, which provides communications between computer processor(s) 304, memory 306, persistent storage 308, communications unit 312, and input/output (I/O) interface(s) 314. Communications fabric 302 can be implemented with any architecture suitable for passing data or control information between processor(s) 304 (e.g., microprocessors, communications processors, and network processors), memory 306, external device(s) 320, and any other hardware components within a system. For example, communications fabric 302 can be implemented with one or more buses.

Memory 306 and persistent storage 308 are computer readable storage media. In the depicted embodiment, memory 306 includes random-access memory (RAM) 316 and cache 318. In general, memory 306 can include any suitable volatile or non-volatile one or more computer readable storage media.

Program instructions for security monitoring program 101 can be stored in persistent storage 308, or more generally, any computer readable storage media, for execution by one or more of the respective computer processor(s) 304 via one or more memories of memory 306. Persistent storage 308 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 312, in these examples, provides for communications with other data processing systems or devices. In these examples, communications unit 312 can include one or more network interface cards. Communications unit 312 may provide communications through the use of either or both physical and wireless communications links. In the context of some embodiments of the present invention, the source of the various input data may be physically remote to computing device 300 such that the input data may be received, and the output similarly transmitted via communications unit 312.

I/O interface(s) 314 allows for input and output of data with other devices that may operate in conjunction with computing device 300. For example, I/O interface(s) 314 may provide a connection to external device(s) 320, which may be as a keyboard, keypad, a touch screen, or other suitable input devices. External device(s) 320 can also include portable computer readable storage media, for example thumb drives, portable optical or magnetic disks, and memory cards. Software and data used to practice embodiments of the present invention can be stored on such portable computer readable storage media and may be loaded onto persistent storage 308 via I/O interface(s) 314. I/O interface(s) 314 also can similarly connect to display 322. Display 322 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
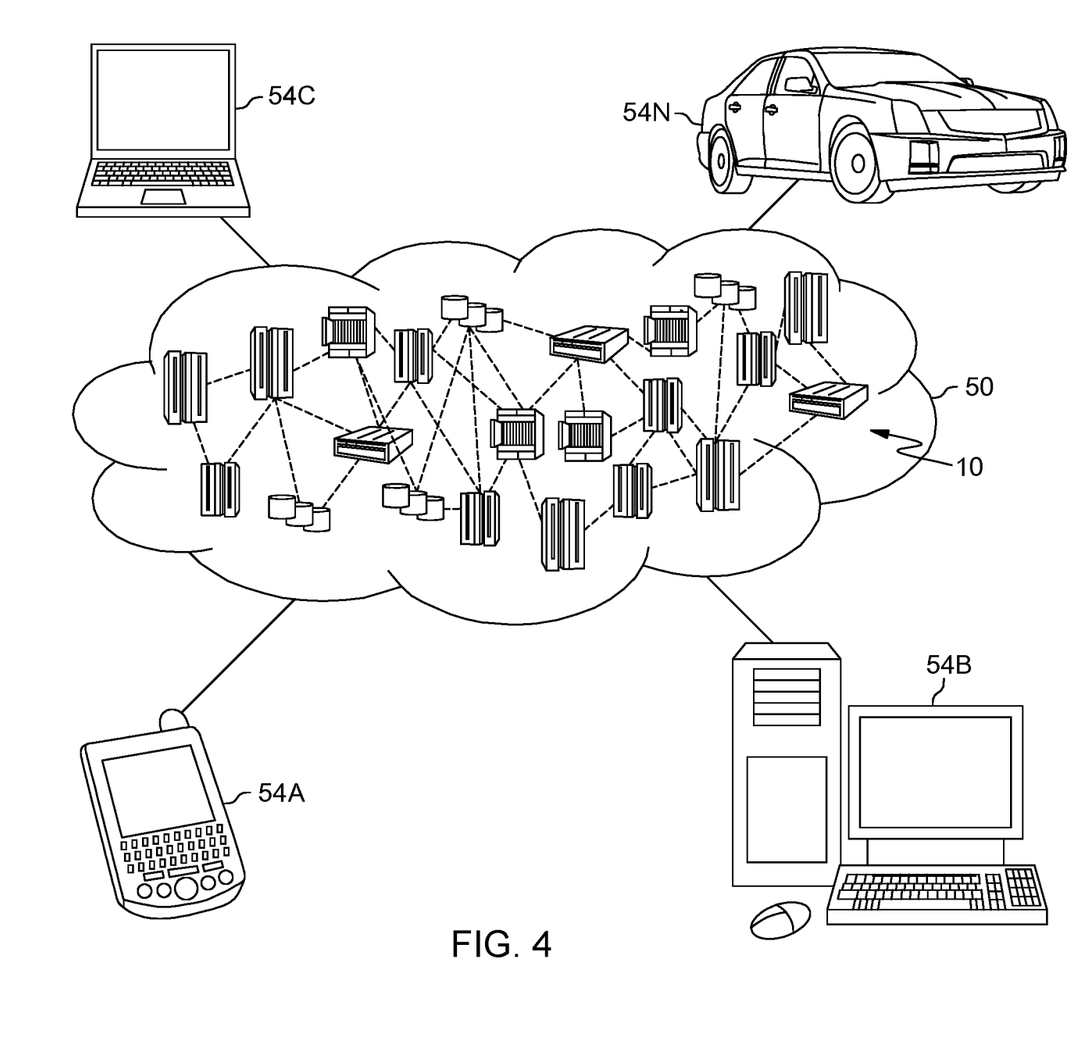
FIG. 4 is a block diagram depicting a cloud computing environment 50 in accordance with at least one embodiment of the present invention.

FIG. 4 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
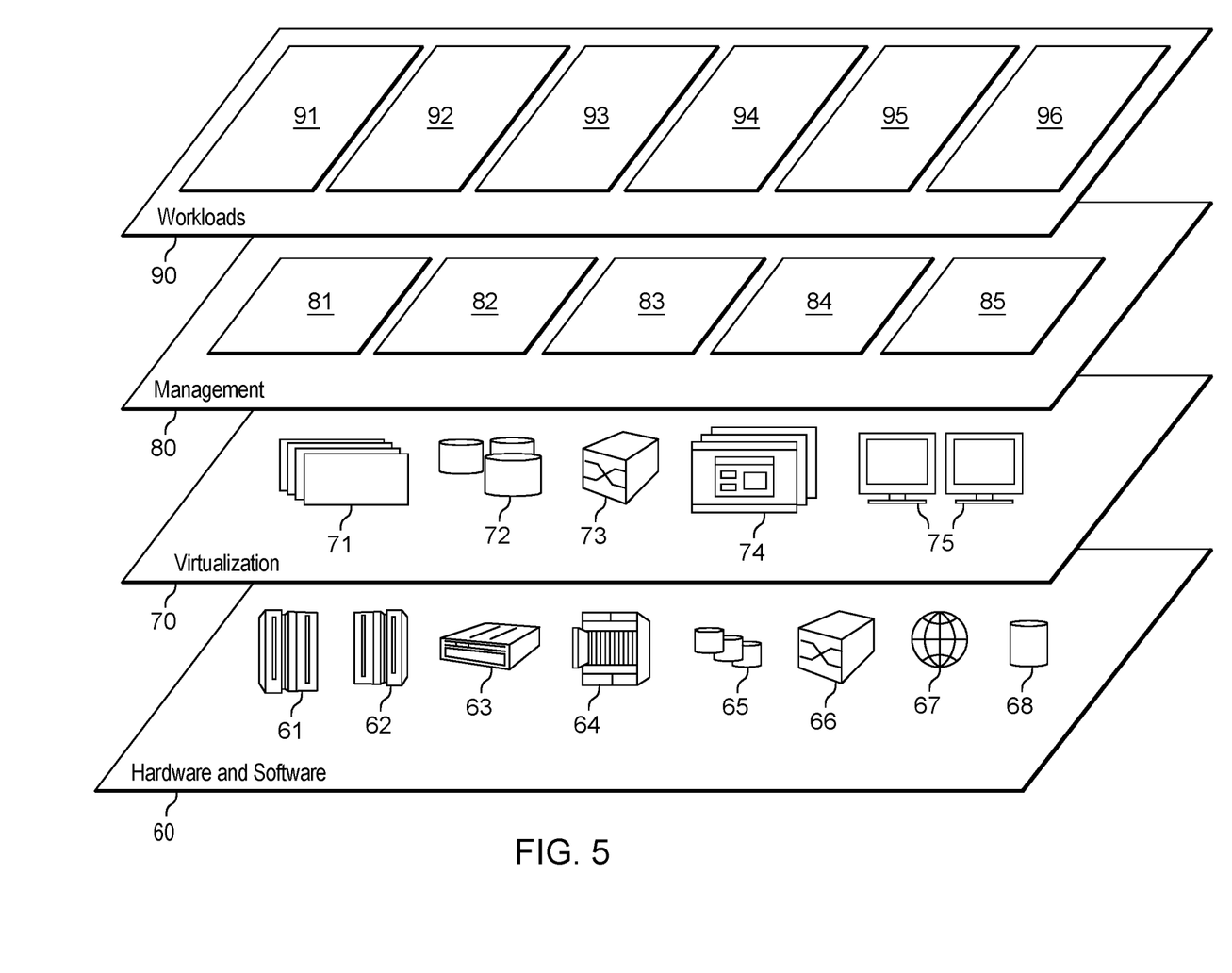
FIG. 5 is block diagram depicting a set of functional abstraction model layers provided by cloud computing environment 50 depicted in FIG. 4 in accordance with at least one embodiment of the present invention.

FIG. 5 is block diagram depicting a set of functional abstraction model layers provided by cloud computing environment 50 depicted in FIG. 4 in accordance with at least one embodiment of the present invention. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and autocorrelation based security monitoring and detection 96.

What is claimed is:

1. A computer-implemented method for autocorrelation based security monitoring and detection, comprising:
   determining that input signal data transmitted to a white noise generator for generating white noise autocorrelates with itself at one or more time lags; and
   responsive to determining that the input signal data transmitted to the white noise generator for generating white noise autocorrelates with itself at one or more time lags:
      determining whether an autocorrelation in the input signal data transmitted to the white noise generator for generating white noise matches one or more predetermined input signal data patterns associated with a known event or individual.

2. The computer-implemented method of claim 1, further comprising:
   determining that the autocorrelation in the input signal data transmitted to the white noise generator for generating white noise does not match a predetermined input signal data pattern associated with a known event or individual; and
   performing a particular type of security action based, at least in part, on an input power and input frequency spectrum associated with the autocorrelation in the input signal data transmitted to the white noise generator for generating white noise.

3. The computer-implemented method of claim 1, further comprising:
   determining that the autocorrelation in the input signal data transmitted to the white noise generator for generating white noise matches a predetermined input signal data pattern associated with a known event;

determining whether the known event is permitted; and responsive to determining that the known event is not permitted, performing a particular type of security action based, at least in part, on the known event.

4. The computer-implemented method of claim 3, wherein determining whether the known event is permitted is based, at least in part, on comparing an input power and input frequency spectrum associated with the autocorrelation in the input signal data transmitted to the white noise generator for generating white noise to a historical input power and input frequency spectrum transmitted to the white noise generator for generating white noise at a time the autocorrelation in the input signal data is detected.

5. The computer-implemented method of claim 1, further comprising:

determining that the autocorrelation in the input signal data transmitted to the white noise generator for generating white noise matches a predetermined input signal data pattern associated with a known individual;

determining that the known individual is located within a secure environment; and responsive to determining that the known individual is not authorized to enter the secure environment, performing a particular type of security action.

6. The computer-implemented method of claim 1, further comprising:

determining that the autocorrelation in the input signal data transmitted to the white noise generator for generating white noise matches a predetermined input signal data pattern associated with a known individual; and tracking a location of the known individual within an environment based, at least in part, on detected changes in input power with respect to the autocorrelation in the input signal data over the one or more time lags.

7. The computer-implemented method of claim 1, wherein a predetermined input signal data pattern associated with a known individual corresponds to an input power and input frequency spectrum previously transmitted to the white noise generator for generating white noise in response to noise captured from one or more of a cadence, stride, or gait of the known individual.

8. A computer program product for autocorrelation based security monitoring and detection, comprising, the computer program product including one or more computer readable storage media and program instructions stored on the one or more computer readable storage media, the program instructions including instructions to:

determine that input signal data transmitted to a white noise generator for generating white noise autocorrelates with itself at one or more time lags; and responsive to determining that the input signal data transmitted to the white noise generator for generating white noise autocorrelates with itself at one or more time lags:

determine whether an autocorrelation in the input signal data transmitted to the white noise generator for generating white noise matches one or more predetermined input signal data patterns associated with a known event or individual.

9. The computer program product of claim 8, further comprising instructions to:

determine that the autocorrelation in the input signal data transmitted to the white noise generator for generating white noise does not match a predetermined input signal data pattern associated with a known event or individual; and perform a particular type of security action based, at least in part, on an input power and input frequency spectrum associated with the autocorrelation in the input signal data transmitted to the white noise generator for generating white noise.

10. The computer program product of claim 8, further comprising instructions to:

determine that the autocorrelation in the input signal data transmitted to the white noise generator for generating white noise matches a predetermined input signal data pattern associated with a known event;

determine whether the known event is permitted; and responsive to determining that the known event is not permitted, perform a particular type of security action based, at least in part, on the known event.

11. The computer program product of claim 10, wherein determining whether the known event is permitted is based, at least in part, on comparing input power and input frequency spectrum associated with the autocorrelation in the input signal data transmitted to the white noise generator for generating white noise to a historical input power and input frequency spectrum transmitted to the white noise generator for generating white noise at a time the autocorrelation in the input signal data is detected.

12. The computer program product of claim 8, further comprising instructions to:

determine that the autocorrelation in the input signal data transmitted to the white noise generator for generating white noise matches a predetermined input signal data pattern associated with a known individual;

determine that the known individual is located within a secure environment; and responsive to determining that the known individual is not authorized to enter the secure environment, perform a particular type of security action.

13. The computer program product of claim 8, further comprising instructions to:

determine that the autocorrelation in the input signal data transmitted to the white noise generator for generating white noise matches a predetermined input signal data pattern associated with a known individual; and track a location of the known individual within an environment based, at least in part, on detected changes in input power with respect to the autocorrelation in the input signal data over the one or more time lags.

14. The computer program product of claim 8, wherein a predetermined input signal data pattern associated with a known individual corresponds to an input power and input frequency spectrum previously transmitted to the white noise generator for generating white noise in response to noise captured from one or more of a cadence, stride, or gait of the known individual.

15. A computer system for autocorrelation based security monitoring and detection, comprising, comprising:

one or more computer processors;

one or more computer readable storage media; and computer program instructions, the computer program instructions being stored on the one or more computer readable storage media for execution by the one or more computer processors, and the computer program instructions including instructions to:

determine that input signal data transmitted to a white noise generator for generating white noise autocorrelates with itself at one or more time lags; and responsive to determining that the input signal data transmitted to the white noise generator for generating white noise autocorrelates with itself at one or more time lags:
　determine whether an autocorrelation in the input signal data transmitted to the white noise generator for generating white noise matches one or more predetermined input signal data patterns associated with a known event or individual.

16. The computer system of claim 15, further comprising instructions to:
　determine that the autocorrelation in the input signal data transmitted to the white noise generator for generating white noise does not match a predetermined input signal data pattern associated with a known event or individual; and
　perform a particular type of security action based, at least in part, on an input power and input frequency spectrum associated with the autocorrelation in the input signal data transmitted to the white noise generator for generating white noise.

17. The computer system of claim 15, further comprising instructions to:
　determine that the autocorrelation in the input signal data transmitted to the white noise generator for generating white noise matches a predetermined input signal data pattern associated with a known individual;
　determine that the known individual is located within a secure environment; and
　responsive to determining that the known individual is not authorized to enter the secure environment, perform a particular type of security action.

18. The computer system of claim 17, wherein determining whether the known event is permitted is based, at least in part, on comparing input power and input frequency spectrum associated with the autocorrelation in the input signal data transmitted to the white noise generator for generating white noise to a historical input power and input frequency spectrum transmitted to the white noise generator for generating white noise at a time the autocorrelation in the input signal data is detected.

19. The computer system of claim 15, further comprising instructions to:
　determine that the autocorrelation in the input signal data transmitted to the white noise generator for generating white noise matches a predetermined input signal data pattern associated with a known individual;
　determine that the known individual is located within a secure environment; and
　responsive to determining that the known individual is not authorized to enter the secure environment, perform a particular type of security action.

20. The computer system of claim 15, further comprising instructions to:
　determine that the autocorrelation in the input signal data transmitted to the white noise generator for generating white noise matches a predetermined input signal data pattern associated with a known individual; and
　track a location of the known individual within an environment based, at least in part, on detected changes in input power with respect to the autocorrelation in the input signal data over the one or more time lags.

* * * * *